United States Patent
Ito et al.

(10) Patent No.: US 12,553,096 B2
(45) Date of Patent: Feb. 17, 2026

(54) BLANK AND STRUCTURAL MEMBER

(71) Applicant: NIPPON STEEL CORPORATION, Tokyo (JP)

(72) Inventors: Yasuhiro Ito, Tokyo (JP); Takashi Yasutomi, Tokyo (JP); Soma Sonobe, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 731 days.

(21) Appl. No.: 17/599,926

(22) PCT Filed: Apr. 10, 2020

(86) PCT No.: PCT/JP2020/016100
§ 371 (c)(1),
(2) Date: Sep. 29, 2021

(87) PCT Pub. No.: WO2020/209357
PCT Pub. Date: Oct. 15, 2020

(65) Prior Publication Data
US 2022/0195548 A1    Jun. 23, 2022

(30) Foreign Application Priority Data
Apr. 10, 2019    (JP) .................. 2019-074620

(51) Int. Cl.
| | |
|---|---|
| *C21D 8/02* | (2006.01) |
| *B21D 35/00* | (2006.01) |
| *B21D 53/88* | (2006.01) |
| *C21D 8/0221* | (2026.01) |
| *C21D 9/46* | (2006.01) |

(52) U.S. Cl.
CPC .......... *C21D 8/0236* (2013.01); *B21D 35/005* (2013.01); *B21D 53/88* (2013.01); *C21D 9/46* (2013.01)

(58) Field of Classification Search
None
See application file for complete search history.

(56) References Cited

U.S. PATENT DOCUMENTS

| | | | |
|---|---|---|---|
| 2009/0220815 A1 | 9/2009 | Canourgues et al. | |
| 2014/0057128 A1* | 2/2014 | Canourgues ........... | B23K 26/32 148/531 |

FOREIGN PATENT DOCUMENTS

| | | |
|---|---|---|
| CN | 109182679 A | 1/2019 |
| JP | 2000-80418 A | 3/2000 |
| JP | 2009-534529 A | 9/2009 |
| JP | 2013-513514 A | 4/2013 |
| JP | 2015-422 A | 1/2015 |
| WO | WO 2011/071434 A1 | 6/2011 |

* cited by examiner

*Primary Examiner* — Xiaowei Su
(74) *Attorney, Agent, or Firm* — Birch, Stewart, Kolasch & Birch, LLP (57) ABSTRACT

A blank (100) includes a main portion (110) that is made of steel having a tensile strength of 1450 MPa or more and a softened portion (120), the ratio of Vickers hardness of the softened portion (120) to the Vickers hardness of the main portion (110) is 0.7 or more and 0.95 or less, and the softened portion (120) is disposed at a position different from a position of the main portion (110) in an in-plane direction. A structural member (200) includes a first member (210), a second member (220), and a weld (W) at which the first member (210) and the second member (220) are welded to each other.

4 Claims, 10 Drawing Sheets

BLANK AND STRUCTURAL MEMBER

TECHNICAL FIELD OF THE INVENTION

The present invention relates to a blank and a structural member.

Priority is claimed on Japanese Patent Application No. 2019-074620, filed Apr. 10, 2019, the content of which is incorporated herein by reference.

RELATED ART

In a case where a blank is worked to form a formed article having a predetermined shape, the strength may be partially changed by hot forming and subsequent quenching.

Patent Document 1 discloses a technique that performs hot forming and press hardening on a blank to manufacture a B-pillar including a portion having different fracture strength.

PRIOR ART DOCUMENT

[Patent Document]
 [Patent Document 1] Published Japanese Translation No. 2013-513514 of the PCT International Publication

DISCLOSURE OF THE INVENTION

Problems to be Solved by the Invention

However, the influence of hot forming on the surface properties of the blank is not considered in the technique disclosed in Patent Document 1. Further, the blank is often welded to another member after forming. The blank is also not considered in Patent Document 1 to be welded to another member after forming. Particularly, the influence of heat, which is input during welding, on the strength of the member is not considered in the welding of the blank to another member.

Accordingly, the invention has been made in consideration of the above-mentioned problems, and an object of the invention is to provide a new and improved blank and structural member that can suppress a change in surface properties after forming and the influence of welding.

Means for Solving the Problem

The gist of the invention is as follows.

(1) A blank according to an aspect of the invention includes a main portion that is made of steel having a tensile strength of 1450 MPa or more and a softened portion, a ratio of the Vickers hardness of the softened portion to the Vickers hardness of the main portion is 0.7 or more and 0.95 or less, and the softened portion is disposed at a position different from the position of the main portion in an in-plane direction.

(2) In (1), the softened portion may be formed over a distance of 50% or more of a sheet thickness from one surface of the blank.

(3) In (1) or (2), the softened portion may be formed in a shape of a band.

(4) In any one of (1) to (3), a plated coating may be formed on the main portion, and the plated coating may not be formed on at least a part of a surface of a portion of the blank where the softened portion is formed.

(5) In any one of (1) to (4), at least two or more softened portions may be formed.

(6) In any one of (1) to (5), at least two or more softened portions may be formed on one surface of the blank.

(7) In any one of (1) to (6), the softened portion may be disposed within 100 mm from an end portion in the in-plane direction.

(8) A structural member according to another aspect of the invention includes a first member, a second member, and a weld at which the first member and the second member are welded to each other; the first member includes a main portion that is made of steel having a tensile strength of 1450 MPa or more, and a softened portion that is provided at a portion including the weld; the ratio of the Vickers hardness of the softened portion to the Vickers hardness of the main portion is 0.7 or more and 0.95 or less; and the softened portion is disposed at a position different from a position of the main portion in an in-plane direction of the first member.

(9) In (8), the first member may have a surface roughness of 0.5 μm or less in terms of Ra.

(10) In (8), the first member may include a plated coating of which an Fe concentration is 20% or less.

(11) In (10), the plated coating may be formed on the main portion, and the plated coating may not be formed on at least a part of a surface of a portion of the first member where the softened portion is formed.

(12) In any one of (8) to (11), the softened portion may be formed over a distance of 50% or more of a sheet thickness from a surface of the first member facing the second member.

(13) In any one of (8) to (12), at least two or more softened portions may be formed.

(14) In any one of (8) to (13), the softened portion may be formed in a shape of a band.

Effects of the Invention

As described above, according to the invention, it is possible to provide a new and improved blank and structural member that can suppress a change in surface properties after forming and an influence on welding.

EMBODIMENTS OF THE INVENTION

Preferred embodiments of the invention will be described in detail below with reference to the accompanying drawings. In this specification and the drawings, components having substantially the same functional configuration will be denoted by the same reference numeral and a repeated description thereof will be omitted.

1. First Embodiment

[Example of External Appearance of Blank]

Figure 1A:
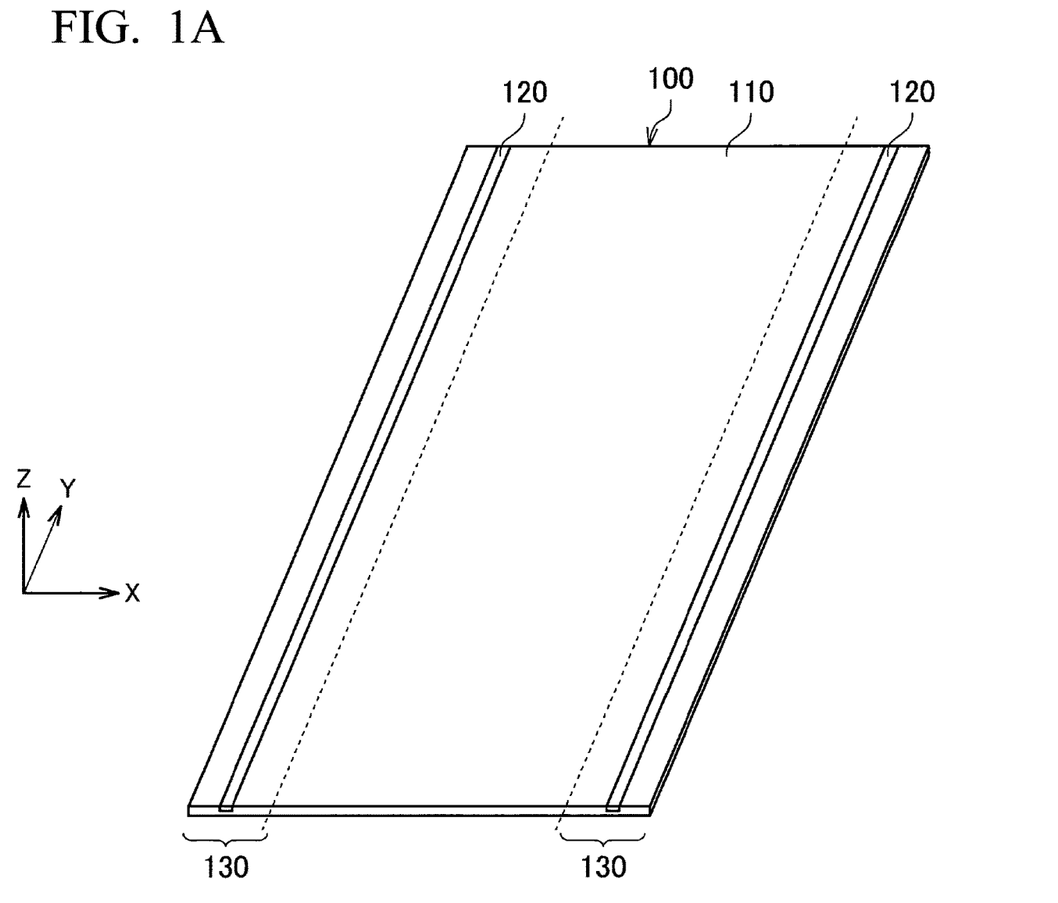
FIG. 1A is a perspective view showing an example of a blank according to a first embodiment of the invention.

First, the schematic configuration of a blank 100 according to a first embodiment of the invention will be described with reference to FIG. 1A. FIG. 1A is a perspective view showing an example of the blank 100 according to this embodiment. The blank 100 is a flat steel sheet, and is formed in a predetermined shape by cold forming. Here, the blank 100 includes a continuous sheet-like steel sheet and a steel sheet that is cut out from a continuous sheet-like steel sheet so as to have a predetermined size.

The blank 100 has at least two surfaces that face each other and have the largest area.

The blank 100 has a predetermined width dimension in a plan view (as viewed in a direction perpendicular to the surfaces facing each other and having the largest area, or as viewed in a sheet thickness direction).

The blank 100 has a sheet thickness in a direction perpendicular to the two surfaces (a surface and a bottom surface) that face each other and have the largest area. The sheet thickness of the blank 100 is substantially uniform in the in-plane direction of the surfaces that face each other and have the largest area. The blank 100 has a sheet thickness of, for example, about 1.0 mm to 4.0 mm. The sheet thickness of the blank 100 is smaller than the width dimension of the blank 100.

The blank 100 may be a steel sheet on which a plated coating is not formed (which is unplated or bare), or may be a plated steel sheet that includes galvanized steel sheets, such as a galvannealed steel sheet and a hot-dip galvanized steel sheet.

Hereinafter, a direction perpendicular to the surfaces of the blank 100, which face each other and have the largest area, may be referred to as a sheet thickness direction (Z direction), a direction perpendicular to the width direction of the blank 100 (X direction) and the sheet thickness direction (Z direction) may be referred to as a longitudinal direction (Y direction), and a direction (a direction along the surfaces facing each other) perpendicular to the sheet thickness direction (Z direction) of the blank 100 may be referred to as an in-plane direction (X-Y direction).

As shown in FIG. 1A, the blank 100 includes a main portion 110, softened portions 120, and joint portion-corresponding regions 130 that are regions forming regions to be welded (corresponding to regions 215 to be welded to be described later in FIG. 3A). The main portion 110 is a region that mainly forms the blank 100, and has the same properties as a steel sheet forming the blank 100. The main portion 110 is made of steel having a tensile strength of 1450 MPa or more, for example, steel having a tensile strength of 1470 MPa.

The softened portions 120 are disposed at positions different from the position of the main portion 110 in the in-plane direction (X-Y direction). Accordingly, regions of the blank 100, which are to be formed into heat affected zones due to welding and joining between a first member (see a substantially hat-shaped member 210 shown in FIG. 3A and the like) and a separate second member (see a plate-like member 220 shown in FIG. 3A and the like) after the blank 100 is formed into the first member by a press or the like, can be softened in advance. Further, regions of the blank 100 other than the regions, which are to be formed into the heat affected zones caused by welding, can be in a high-strength (high-hardness) state without being softened. Accordingly, a difference in hardness between the softened portion 120 and the heat affected zone, which is caused by welding, of a structural member, which uses a formed member based on the blank 100, is reduced, so that the influence of welding can be suppressed and the blank 100 can be suitably used for a structural member having a high strength and high impact resistance performance.

Further, the softened portions 120 are disposed within 100 mm from end portions in the in-plane direction. For example, as shown in FIG. 1A, the softened portions 120 are formed in the joint portion-corresponding regions 130 within 100 mm from both end portions of the blank 100 in the width direction of the blank 100 (the X direction in FIG. 1A). The main portion 110 may be disposed a range other than the regions in which the softened portions 120 are disposed. Furthermore, the main portion 110 may be disposed in a range exceeding 100 mm from the end portions in the in-plane direction. In a case where the softened portions 120 are disposed within 100 mm from the end portions in the in-plane direction, the heat affected zones caused by welding can be included in the softened portions 120 even if the end portions of the blank 100 are cut about 20 mm in, for example, press forming, the finishing of a structural member, or the like to be performed later.

In this way, the regions of the blank 100, which are to be formed into the heat affected zones caused by welding, can be softened in advance and regions other than those regions can be in a high-strength (high-hardness) state. Accordingly, a difference in hardness between the softened portion 120 and the heat affected zone, which is caused by welding, of a structural member, which uses a formed member based on the blank 100, is reduced, so that the influence of welding can be suppressed and the blank 100 can be suitably used for a structural member having a high strength and high impact resistance performance.

The softened portions 120 are regions that are softer than the main portion 110 and are partially formed on the blank 100. Further, the softened portions 120 are formed so as to be included in the joint portion-corresponding regions 130. The details of the softened portions 120 will be described later. Each joint portion-corresponding region 130 is a part of the blank 100, and is a region that forms a portion (for example, a flange) to be welded to another member after the blank 100 is formed in a predetermined shape. For example, the joint portion-corresponding regions 130 are ranges having a predetermined length in the width direction from both ends of the blank 100 in the width direction of the blank 100 (the X direction in FIG. 1A). Further, the joint portion-corresponding regions 130 may be provided not at the end portions but substantially in the middle of the blank 100 in the width direction.

The blank 100 according to this embodiment is formed into a formed article having a predetermined shape by cold forming, and is then welded to another member through welds W.

[Problems of Welding Process and Problems of Hot Forming]

Here, it is known in the related art that the characteristics and structure of a peripheral region of a region (welding nugget) where a base material is melted and solidified due to welding are changed from those of the base material due to heat input during welding. The peripheral region is called a heat affected zone (HAZ). In a case where a member to be welded is a steel including a martensitic structure, temper softening partially occurs due to a temperature rise caused by heat input in the heat affected zone. As a result, the hardness of the heat affected zone may be reduced with respect to the hardness of the base material. There is a possibility that such a reduction in hardness in the heat affected zone causes fracture in a case where a member subjected to welding receives a load, and significantly affects the strength of the entire member.

In addition, in a case where a member to be welded is a high tensile strength steel sheet, the influence of a reduction in hardness in the heat affected zone is increased. That is, since the hardness of an original base material is sufficiently high in the case of steel having a relatively high strength, hardness in the heat affected zone tends to be significantly reduced. Particularly, in a case where welding is performed on steel having a tensile strength of 1450 MPa or more, the influence of a reduction in hardness in the heat affected zone is significant. Further, even in a case where a high tensile strength steel sheet is formed by hot stamping forming, the influence of a reduction in hardness in the heat affected zone is significant in welding to be performed later.

On the other hand, softening a welded portion by partially heating the welded portion after the start of forming is also considered in order to suppress the influence of a reduction in hardness in the heat affected zone. Specifically, treatment for preheating and softening a portion near a portion to be welded before welding to suppress the concentration of strain on the heat affected zone, and the like may be performed. However, since the strength of a member is increased in a case where forming is hot stamping forming, the above-mentioned softening treatment needs to be performed after the start of forming. For this reason, an influence on the shape accuracy of a formed article may be generated due to thermal strain in a method of softening a welded portion by heating the welded portion after the start of forming.

Further, the use of a technique partially changing the fracture strength of a member by press hardening using hot forming as in the technique disclosed in Patent Document 1 is also considered.

However, strength can be partially changed in the technique, but there is a concern about the influence of hot forming on the surface properties of a blank. That is, an oxide film (scale) of a base material or a coating provided on the surface of the base material may be formed on the surface of the blank due to heating. Since the generation of significant scale causes poor external appearance or the like, there is a possibility that characteristics required for a product are not satisfied. For this reason, since it is necessary to take measures, such as separately providing a process of removing scale after hot forming, it is supposed that manufacturing cost and man-hours are increased. Further, in a case where the blank is plated, there is a possibility that plating is modified due to hot forming and corrosion resistance is lowered.

Accordingly, as a result of diligent studies, the inventors have supposed that not a steel for hot forming but a high tensile strength steel sheet having a tensile strength of 1450 MPa or more is used as the blank 100 being in a stage before forming and the softened portions 120 are provided in the joint portion-corresponding regions 130 on the blank 100. Therefore, the inventors have found that the influence of a reduction in hardness caused by the heat affected zones can be suppressed in a case where the blank 100 is welded to another member while being formed in a predetermined shape by not hot forming but cold forming and the degradation of surface properties, which is difficult to be avoided in hot forming, can be suppressed. That is, in a case where such a blank 100 is used, it is possible to form a member, in which cracks and the like generated due to a reduction in hardness caused by the heat affected zones generated due to welding are less likely to be generated, by cold forming at a low cost while avoiding the degradation of surface properties caused by hot forming. The softened portions 120 according to this embodiment will be described below.

[Softened Portion]

The softened portion 120 is a region that is formed in at least a part of the joint portion-corresponding region 130 on the blank 100 and is softer than the main portion 110. At least two or more softened portions 120 are formed on the blank 100. The ratio of the Vickers hardness of the softened portion 120 to the Vickers hardness of the main portion 110 is 0.7 or more and 0.95 or less.

Further, at least two or more softened portions 120 may be formed on one surface of the blank 100.

Since the Vickers hardness of the softened portion 120 is 0.95 or less with respect to the Vickers hardness of the main portion 110, it is possible to suppress the influence of a reduction in hardness that causes a problem in the case of a high tensile strength steel sheet having a tensile strength of 1450 MPa or more and is significant in the heat affected zone in a case where welding is performed in the joint portion-corresponding region 130. That is, a difference between the hardness of the softened portion 120 and the hardness of the heat affected zone is sufficiently smaller than a difference between the hardness of the main portion 110 and the hardness of the heat affected zone. For this reason, problems, such as cracks and the like caused by a difference in hardness, are less likely to be generated in a case where a member is deformed after the forming of the member. Hereinafter, the heat affected zone and the weld W may be used for the same meaning.

On the other hand, since the Vickers hardness of the softened portion 120 is 0.7 or more with respect to the Vickers hardness of the main portion 110, the high strength of the blank 100 can be maintained. In addition, since the Vickers hardness of the softened portion 120 is 0.7 or more with respect to the tensile strength of the main portion 110, the concentration of deformation on the softened portion 120 in a case where the blank 100 is used for forming is suppressed. As a result, the formability of the blank 100 is ensured.

A method of measuring the Vickers hardness of the main portion and the softened portion is as follows. Portions corresponding to the main portion and the softened portion are taken from the blank 100 as samples, the surface of the sheet is polished by a depth of 100 to 200 μm in a case where a plated coating is not formed on the surface of the sheet, and the surface of the sheet is then polished by a depth of 100 to 200 μm after a plated coating is removed by grinding in a case where the plated coating is formed on the surface of the sheet, so that mirror sample samples are obtained. Then, a Vickers indenter is pushed against the surface of the sheet in a direction substantially perpendicular to the surface of the sheet to measure hardness. A hardness test is performed by a method disclosed in JIS Z 2244:2009. Hardness is measured using a micro-Vickers hardness tester at 10 points that are arranged at intervals of three times or more the indentation under a load of 1 kgf, and the average value of the measured values is used as Vickers hardness.

Figure 1B:
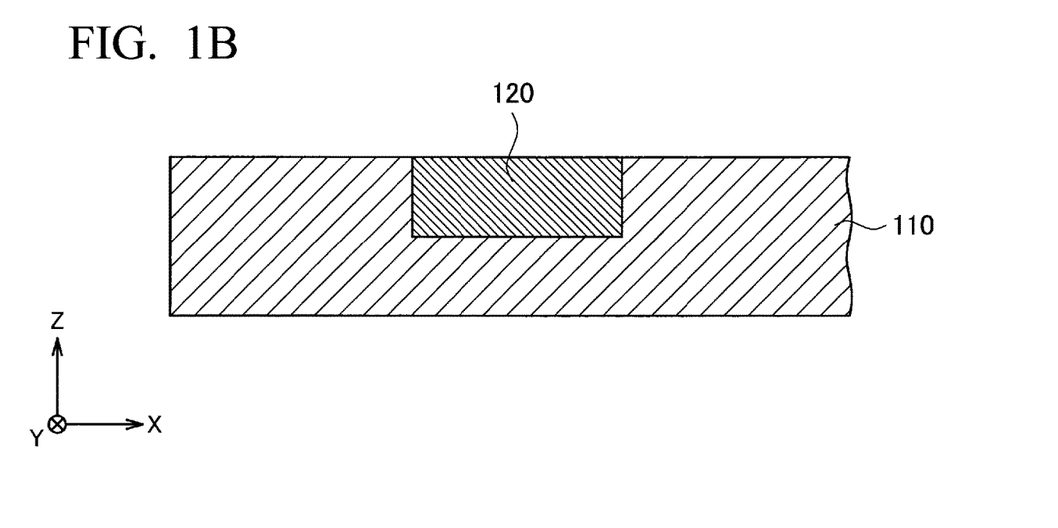
FIG. 1B is a partial cross-sectional view of the blank according to the first embodiment.

The softened portion 120 may be formed to include a region, in which where there is a concern about the influence of a reduction in hardness caused by welding, in the sheet thickness direction of the blank 100 (the Z direction in FIG. 1A). For example, as shown in FIG. 1B, the softened portion 120 may be provided over a distance of 50% or more of a sheet thickness in the sheet thickness direction from the surface facing a mating member during welding. Accordingly, in a case where a formed article and the mating member are pulled in directions where the formed article and the mating member are separated from each other, the influence of a reduction in hardness of the heat affected zone is suppressed. As a result, cracks and the like near the welds W can be suppressed. Further, the softened portion 120 may be provided over a distance of 80% or more of a sheet thickness in the sheet thickness direction from the surface facing the mating member during welding.

Figure 1C:
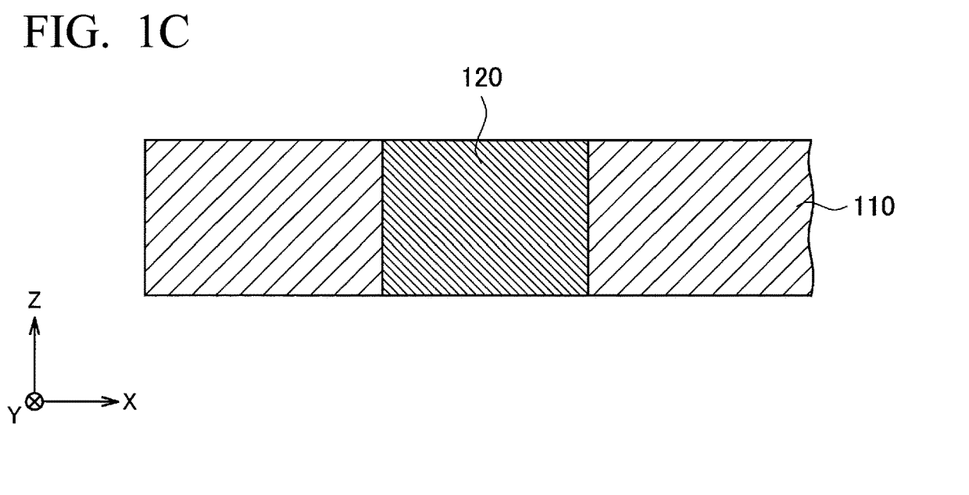
FIG. 1C is a partial cross-sectional view of the blank according to the first embodiment.

Furthermore, the softened portion 120 may be formed over the entire area of the blank 100 in the sheet thickness direction as shown in FIG. 1C. In a case where a part in which a formed member and the mating member are assembled by welding is deformed so as to be bent, forces in a tensile direction are generated near the welds W (see FIG. 3B and the like). Since the softened portion 120 is formed over the entire area in the sheet thickness direction, strain near the welds W is reduced. As a result, cracks and the like can be suppressed.

Further, as shown in FIG. 1A, the softened portion 120 may be formed in the shape of a band of which a longitudinal direction is parallel to the longitudinal direction of the blank 100 (the Y direction in FIG. 1A) and a width direction is parallel to a direction (the X direction in FIG. 1A) orthogonal to the longitudinal direction in the plan view of the blank 100. In this case, the length of the softened portion 120 in the width direction may be 40 mm or less. Particularly, the length of the softened portion 120 in the width direction may be 30 mm or less. Further, the length of the softened portion 120 in the width direction may not be constant. Since the softened portion 120 has a predetermined length in the width direction, the softened portion 120 is included in the range of the joint portion-corresponding region 130. Accordingly, it is possible to suppress the influence of a reduction in hardness that is caused by heat input during welding in a region to be welded after the forming of the blank 100. Further, since the softened portion 120 has a predetermined length in the width direction, it is possible to cope with a change in a welding position.

Figure 2A:
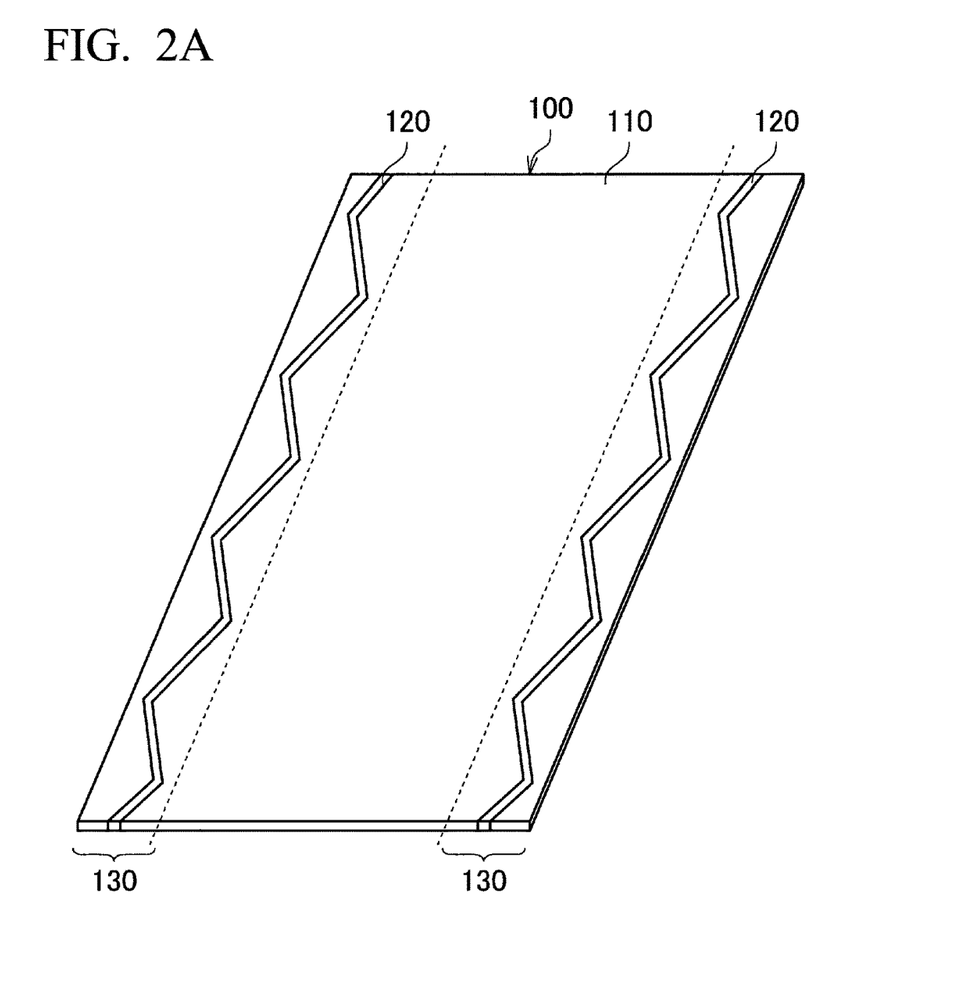
FIG. 2A is a perspective view showing another example of the blank according to the first embodiment of the invention.
Figure 2B:
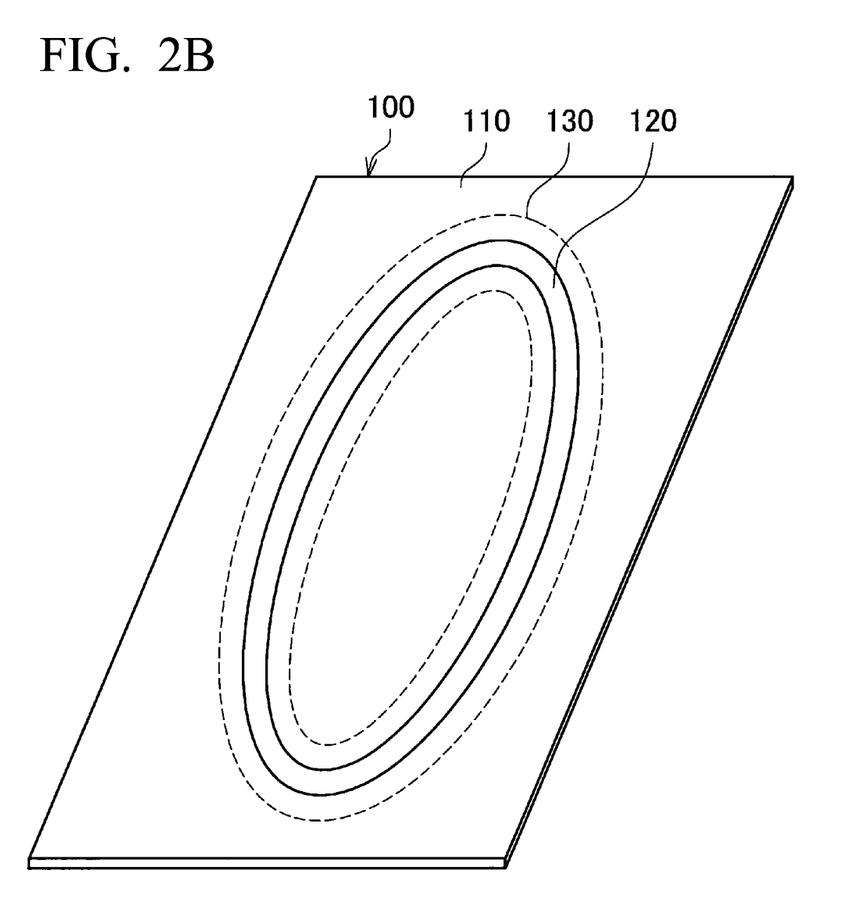
FIG. 2B is a perspective view showing another example of the blank according to the first embodiment of the invention.
Figure 2C:
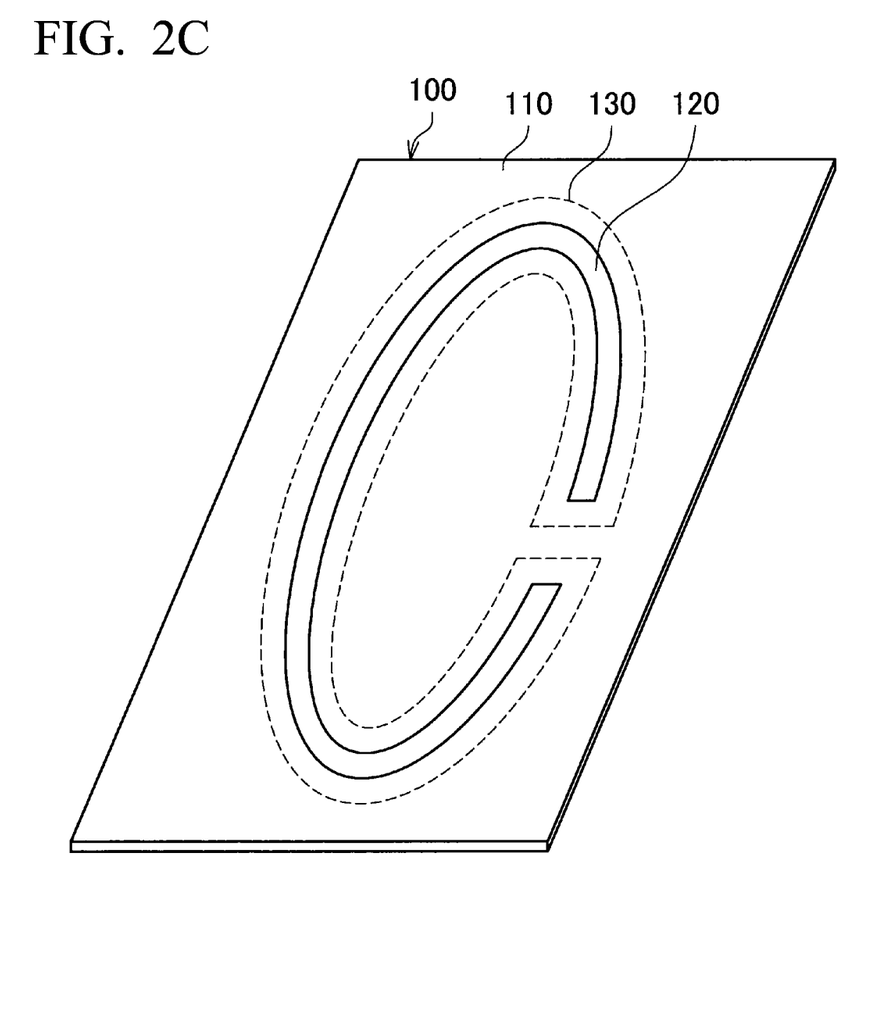
FIG. 2C is a perspective view showing another example of the blank according to the first embodiment of the invention.

The softened portion 120 may be provided not only in the shape of a band but also in a zigzag shape as shown in FIG. 2A. Further, the softened portion 120 may be provided in the shape of a closed curve (a circular shape, an oval shape, or the like) as shown in FIG. 2B. Furthermore, the softened portion 120 may be provided in a C shape as shown in FIG. 2C. In addition, the softened portion 120 may be provided in the shape of a dot or a U shape. Further, the softened portion 120 may be formed in a region that includes a region in which a formed welding nugget is provided.

Examples of a method of forming the softened portion 120 include a method of softening the softened portion 120 by partially tempering the softened portion 120 using a publicly known partial heating technique, such as laser heating or high-frequency heating, to reduce a tensile strength. Any other method, which can reduce a tensile strength by partially reducing hardness, may be used as a method of forming the softened portion 120 and a method other than tempering using heating may also be used. For example, a method of partially decarbonizing the softened portion 120, and the like may be used.

[Configuration of Structural Member Using Blank]

Next, the configuration of a structural member 200 using the blank 100 according to this embodiment will be described with reference to FIGS. 3A to 3C. FIG. 3A is a perspective view showing an example of a structural member 200 according to this embodiment. FIG. 3B is a schematic diagram of a cross section taken along line I-I' of FIG. 3A. As shown in FIG. 3A, the structural member 200 according to this embodiment includes, for example, a substantially hat-shaped member 210 as a first member and a plate-like member 220 as a second member. The blank 100 is formed so as to have a substantially hat-shaped cross section by cold forming, so that the substantially hat-shaped member 210 is formed. Examples of cold forming include publicly known cold forming techniques, such as press bending and press drawing, and are not particularly limited.

The first member may be a formed article obtained from the cold forming of the blank 100 that is a bare steel on which a plated coating is not formed. Specifically, the first member, which is a formed article obtained from the cold forming of the blank 100 that is a bare steel, has a surface roughness of 0.5 μm or less in terms of Ra (JIS B0601: 2001). In contrast, oxidized scale having a thickness of about 7 μm is formed on the surface of a formed article, which is obtained from the hot forming, such as hot stamping, of the blank that is a bare steel. However, this oxidized scale is removed by shot blasting or the like, so that the formed article has a surface roughness of 0.5 μm or more in terms of Ra. Accordingly, the first member, which is a formed article obtained from the cold forming of the blank 100 that is a bare steel, can be distinguished from the formed article which is obtained from the hot forming of the blank that is a bare steel.

Figure 3A:
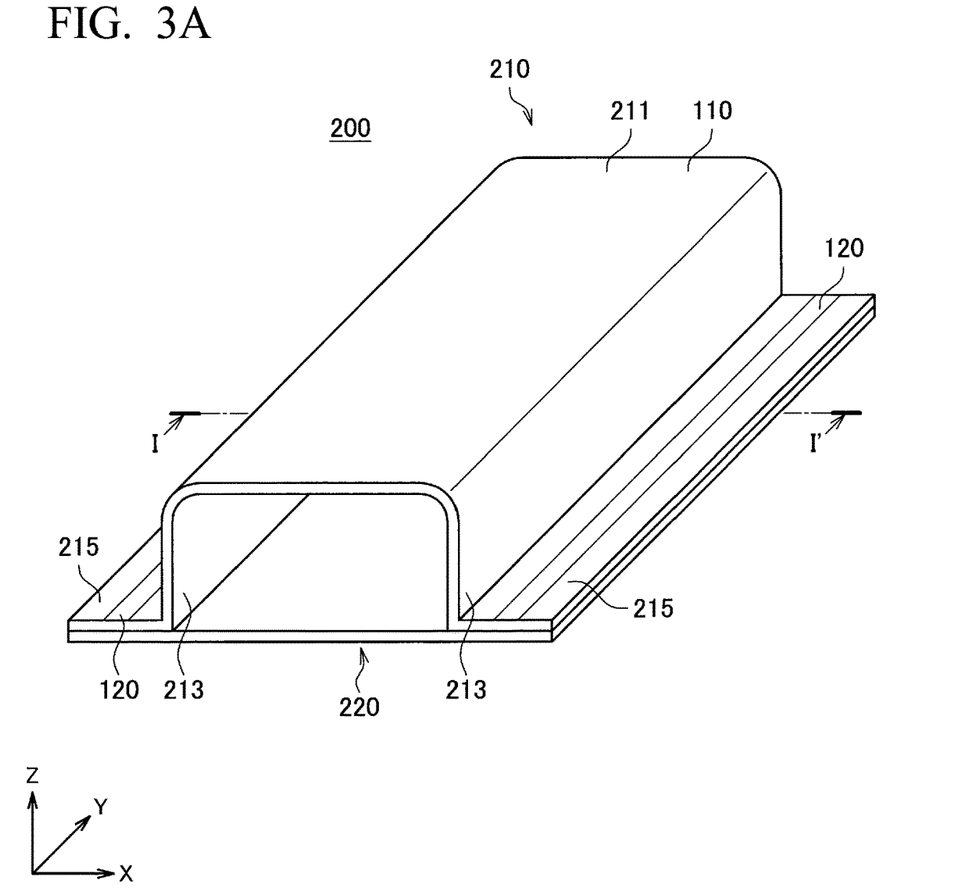
FIG. 3A is a perspective view showing an example of a structural member according to the first embodiment.
Figure 3B:
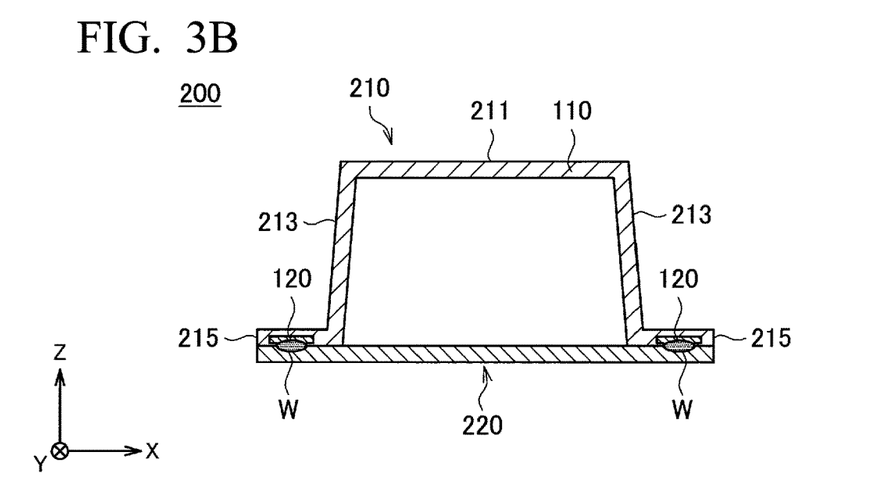
FIG. 3B is a schematic diagram of a cross section taken along line I-I' of FIG. 3A.

As shown in FIG. 3A, the substantially hat-shaped member 210 includes a top sheet portion 211, standing wall portions 213 that are bent from the top sheet portion 211, and flange-like regions 215 to be welded that are bent from the sides of the standing wall portions 213 opposite to the top sheet portion 211.

Here, the softened portions 120 are disposed at positions different from the position of the main portion 110 in the in-plane direction of the substantially hat-shaped member 210 (first member). As described above, the softened portions 120 can be disposed in the regions to be welded in the in-plane direction and the main portion 110 having a relatively high strength can be disposed in a region away from the regions 215 to be welded in the in-plane direction. Accordingly, it is possible to suppress a reduction in weld strength at the welds W of the structural member 200 and to improve the impact resistance performance (crush resistance performance) of the structural member 200. The in-plane direction is a direction along the sheet surface of the substantially hat-shaped member 210 (first member), and means a direction perpendicular to the sheet thickness direction of the substantially hat-shaped member 210 (first member).

Each softened portion 120 is formed in at least a part of the region 215 to be welded. That is, the blank 100 is formed into the substantially hat-shaped member 210 by cold forming, so that the softened portions 120 formed in the joint portion-corresponding regions 130 of the blank 100 are formed in the regions 215 to be welded. Portions where the softened portions 120 are formed include the welds W. Here, as in the example of 50% shown in FIG. 3B, the softened portion 120 is formed over a distance of 50% or more of a sheet thickness in the sheet thickness direction from the surface of the region 215 to be welded facing the plate-like member 220.

The width of the softened portion 120 may be 20 mm or more so as to be capable of including the entire width of the weld W that is 20 mm or less, and may be in a range of, for example, 30 mm to 80 mm.

Figure 3C:
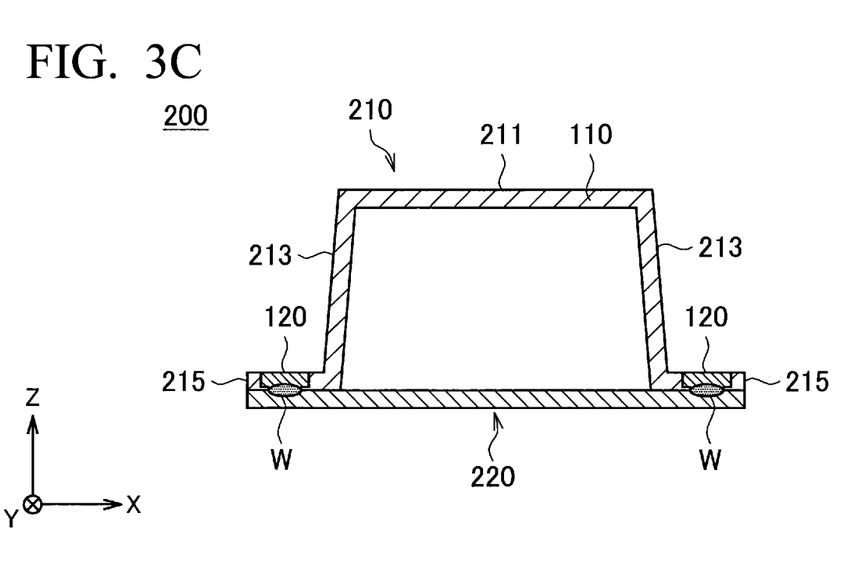
FIG. 3C is a schematic diagram of a cross section showing another example of the cross-sectional structure of the structural member according to the first embodiment.

As shown in FIG. 3C, the softened portion 120 may be formed over the entire area in the sheet thickness direction from the surface of the region 215 to be welded facing the plate-like member 220, that is, over a distance of 100% of the sheet thickness of the substantially hat-shaped member 210 (first member), or may be formed over an arbitrary distance in a range equal to or larger than 50% and less than 100% of the sheet thickness of the substantially hat-shaped member 210. In a case where the softened portion 120 is formed over an arbitrary distance in a range equal to or larger than 50% and less than 100% of the sheet thickness of the substantially hat-shaped member 210 (first member) from the surface of the region 215 to be welded facing the plate-like member 220, the softened portion 120 may not be formed at a remaining portion opposite to the surface of the region 215 to be welded facing the plate-like member 220. That is, the ratio of the Vickers hardness of a remaining portion, which is opposite to the surface of the region 215 to be welded facing the plate-like member 220, to the Vickers hardness of the main portion 110 may not be 0.7 or more and 0.95 or less, such 1.0.

As shown in FIG. 3B, the substantially hat-shaped member 210 is welded to the plate-like member 220 that is a closing plate. At least a part of the softened portion 120 is formed to be softened in the region 215 to be welded.

Welding nuggets as the welds W are formed in the interface between the substantially hat-shaped member 210 and the plate-like member 220 and join the substantially hat-shaped member 210 and the plate-like member 220. The welding nuggets may be formed in a linear shape in the longitudinal direction of the structural member 200 (the Y direction in FIG. 3A). Further, the welding nuggets may be provided not only in a linear shape but also in the shape of a dot, in a C shape, in a U shape, in an oval shape, or in a zigzag shape in a top view (as viewed in the Z direction in FIG. 3B).

The width (a dimension in the width direction of the first member) of the weld W is usually within 20 mm.

Various joining techniques, which are publicly known techniques, can be applied to form the welding nugget. Examples of a method of forming the welding nugget include spot welding, laser welding, and the combined use of spot welding and laser welding.

[Method of Manufacturing Blank 100 and Structural Member 200]

Figure 4:
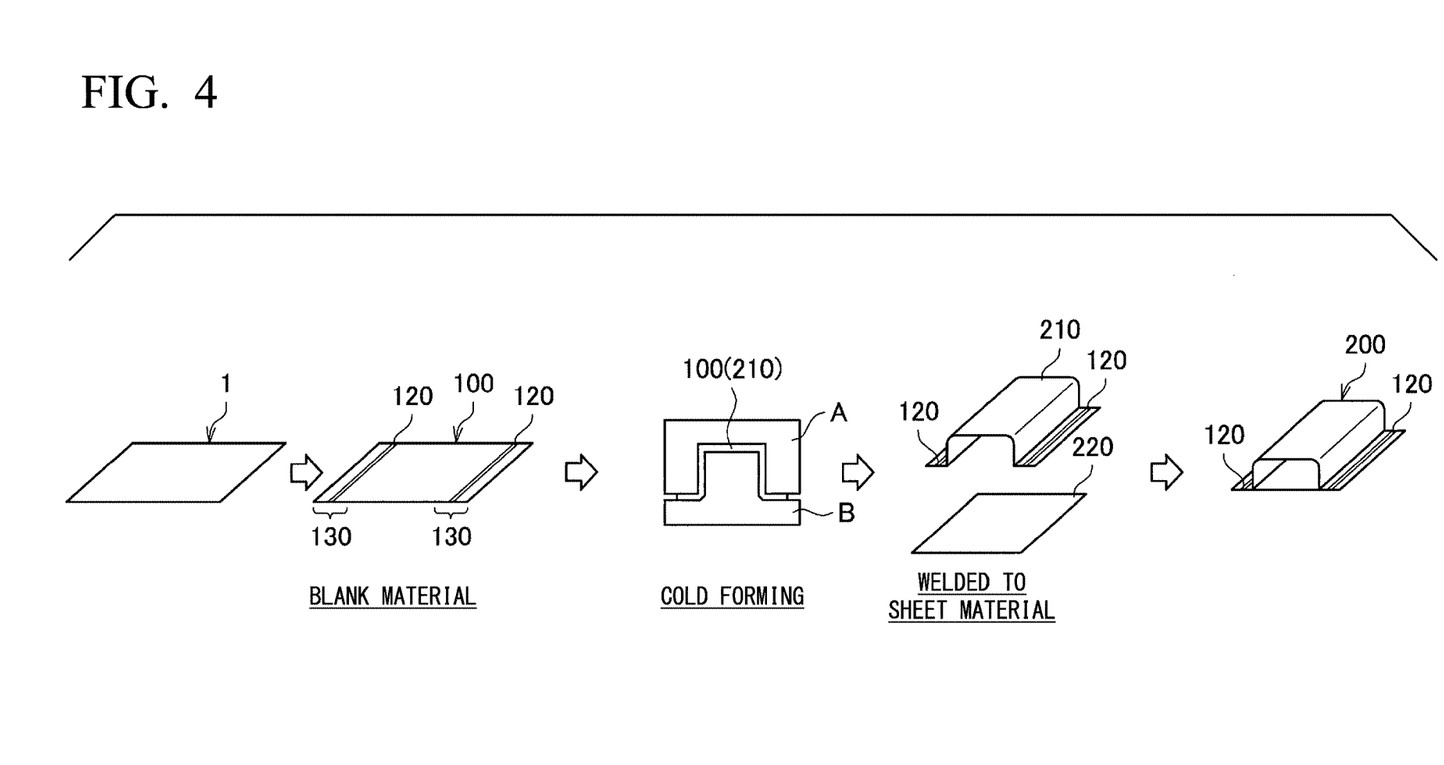
FIG. 4 is a diagram illustrating a method of manufacturing the blank and the structural member according to the first embodiment.

Next, an example of a method of manufacturing the blank 100 and the structural member 200 according to this embodiment will be described with reference to FIG. 4. FIG. 4 is a diagram illustrating an example of a method of manufacturing the blank 100 and the structural member 200 according to this embodiment. As shown in FIG. 4, a high tensile strength steel sheet 1 is prepared first. Subsequently, as the result of partial heat treatment, such as laser heating, performed on the steel sheet, the softened portions 120 are formed in the joint portion-corresponding regions 130, so that the blank 100 is formed. After that, cold forming is performed on the blank 100, so that a formed article having a predetermined shape is formed. For example, the blank 100 is subjected to press forming by an upper die A and a lower die B that are a pair of upper and lower dies, so that the substantially hat-shaped member 210 having a substantially hat-shaped cross section is formed as shown in FIG. 4. The substantially hat-shaped member 210 is welded to another member, such as the plate-like member 220, through the regions 215 to be welded including the softened portions 120. As a result, the structural member 200 is formed. The method of manufacturing the blank 100 and the structural member 200 according to this embodiment has been described above.

According to this embodiment, the blank 100 includes the main portion 110 that is made of steel having a tensile strength of 1450 MPa or more and the softened portions 120, and a ratio of the Vickers hardness of the softened portion 120 to the Vickers hardness of the main portion 110 is 0.7 or more and 0.95 or less. Accordingly, it is possible to suppress the influence of a reduction in hardness in the heat affected zone during welding while suppressing an influence on surface properties in a case where the high-strength blank 100 is formed. Further, the Vickers hardness of the softened portion 120 is set to be in a predetermined range with respect to the Vickers hardness of the main portion 110. Accordingly, it is possible to ensure the high strength and formability of the blank 100 while suppressing the influence of a reduction in hardness in the heat affected zone.

Furthermore, according to this embodiment, the blank 100 is subjected to not hot forming but cold forming and is formed into a formed article that is to be welded to another member. Accordingly, the generation of scale on the surface of the blank 100 in the case of hot forming is suppressed. As a result, since a process for removing scale in the case of hot forming is not required or can be simplified, manufacturing costs are reduced.

In addition, since cold forming is performed, a change in the tensile strength of the softened portion 120 during forming is suppressed as compared to hot forming. Accordingly, an effect of reducing the influence of a reduction in hardness during welding, which is obtained from the softened portion 120, is ensured even after cold forming. Further, in a case where scale is generated in the joint portion-corresponding region 130 due to heating during hot forming, a reduction in weld strength may occur in the welding to be performed after hot forming. However, according to this embodiment, a reduction in weld strength can be suppressed since the generation of scale is suppressed due to cold forming.

Furthermore, according to this embodiment, it is not necessary to perform softening treatment accompanied by heating to be performed after the start of forming since cold forming is performed on the blank 100 provided with the softened portions 120. As a result, the influence of thermal strain on shape accuracy is suppressed.

Moreover, according to this embodiment, forming is accurately performed by cold forming from the viewpoint that the influence of thermal strain on shape accuracy does not occur. Accordingly, the joint portion-corresponding regions 130 provided with the softened portions 120 are accurately formed as regions 215 to be welded after forming. Therefore, the softened portions 120 can be disposed at predetermined positions in the regions 215 to be welded of the structural member 200.

Modification Example

Figure 5:
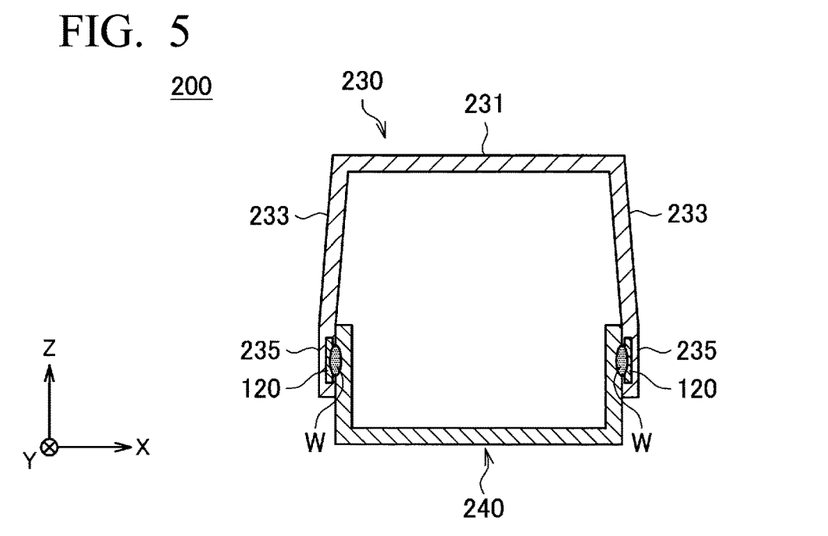
FIG. 5 is a schematic diagram of a cross section showing another example of the cross-sectional structure of the structural member according to the first embodiment.

Subsequently, a modification example of the structural member according to the first embodiment of the invention will be described with reference to FIG. 5. FIG. 5 is a schematic diagram of a cross section showing another example of the cross-sectional structure of the structural member according to this embodiment. The description of contents common to the description of the first embodiment may be omitted in the description of this modification example.

In this modification example, a first member is a substantially U-shaped member 230 having a U shape in a cross-sectional view taken along an X-Z plane as shown in FIG. 5. The substantially U-shaped member 230 includes a top sheet portion 231, standing wall portions 233, and regions 235 to be welded. The regions 235 to be welded are provided at end portions of the substantially U-shaped standing wall portions 233 opposite to the top sheet portion 231, and are welded to a second member. A softened portion 120 including a weld W is formed at each of the regions 235 to be welded. Further, the second member is a mating member 240 that has a U shape in a cross-sectional view taken along an X-Z plane.

According to this modification example, it is easy to work the first member since the first member is formed in a shape without a flange portion. Further, according to this modification example, the accuracy of a welding position is not required since the regions 235 to be welded are provided at the end portions of the standing wall portions 233.

2. Second Embodiment

Figure 6A:
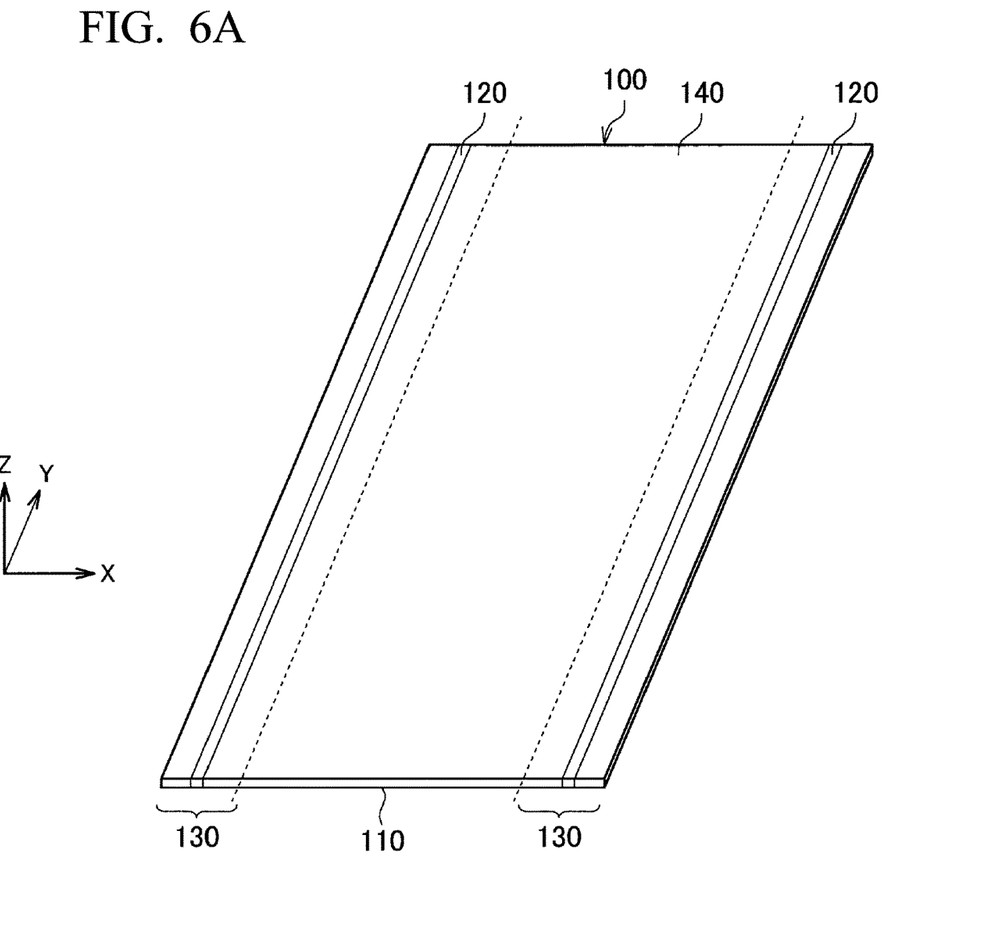
FIG. 6A is a perspective view of a blank according to a second embodiment of the invention.
Figure 6B:
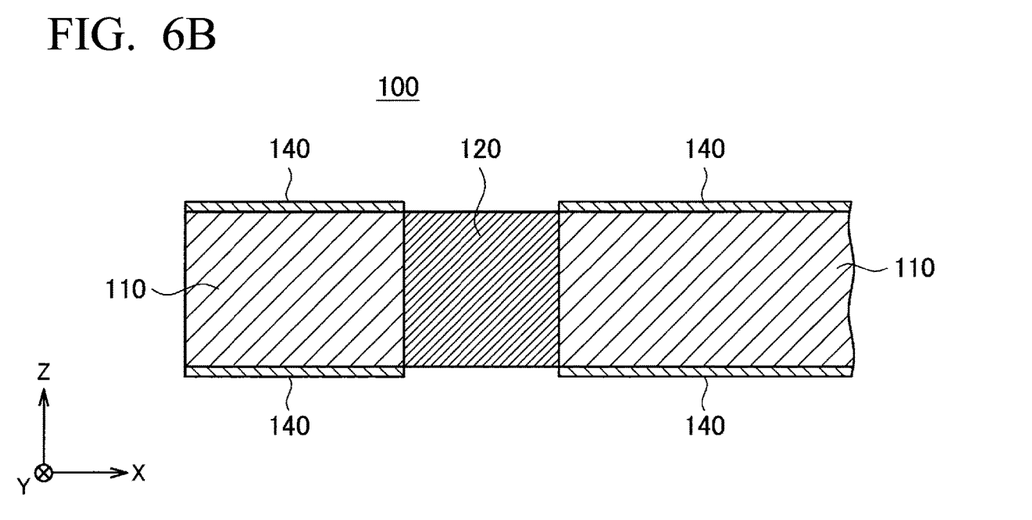
FIG. 6B is a partial cross-sectional view of the blank according to the second embodiment.

Subsequently, a blank 100 according to a second embodiment of the invention will be described with reference to FIGS. 6A and 6B. FIG. 6A is a perspective view of the blank 100 according to the second embodiment of the invention. FIG. 6B is a partial cross-sectional view of the blank 100 according to the second embodiment. The blank 100 according to this embodiment is different from the blank according to the first embodiment in that the blank 100 according to this embodiment includes a plated coating 140 on the surface thereof. The description of configuration common to the first embodiment will be omitted in the description of this embodiment.

As shown in FIG. 6A, the plated coating 140 is formed on a main portion 110 of the blank 100 to coat the surface of the main portion 110. Examples of the plated coating 140 include a zinc plated coating that is provided to improve corrosion resistance and includes a zinc (Zn)-based alloy as a main component. On the other hand, as shown in FIG. 6B, the plated coating 140 is not formed on at least a part of the surface of the blank 100 where the softened portions 120 are formed. That is, a part or all of the surfaces of the softened portions 120 are exposed to the outside. The invention is not limited to the example shown in FIG. 6B. In a case where the softened portions 120 are formed on, for example, one surface of the blank 100, the plated coating 140 may not be formed on at least a part of the surface of the blank 100 on which the softened portions 120 are formed. Further, in a case where the softened portions 120 are formed on one surface of the blank 100, the plated coating 140 may not be formed in regions of both surfaces of the blank 100 corresponding to portions where the softened portions 120 are formed.

The blank 100 where the plated coating 140 is formed on the surface of the main portion 110 is formed into a formed article having a predetermined shape by cold forming. The formed article (first member) of the blank 100, which is formed by cold forming, includes a plated coating of which the Fe concentration is 20% or less and is lower than the Fe concentration of a plated coating of a formed article which is formed by hot forming, such as hot stamping, and of which the Fe concentration of a plated coating may become 50% or more due to the diffusion of an iron component of a base material in the plated coating caused by heating. Since the content rate of plated metal, such as zinc, contained in the plated coating can be made relatively high in the formed article (first member) that is formed from the cold forming of the blank 100 including a plated coating, the formed article can have high corrosion resistance. Further, the formed article (first member) of the blank 100, which is formed by cold forming, can be distinguished from the formed article of the blank that is formed by hot forming.

Furthermore, such a formed article is welded to another member. In this case, welding is performed at the softened portions 120 including portions of the surface on which the plated coating 140 is not formed, so that the formed article having a predetermined shape is welded to another member.

According to this embodiment, since the blank 100 is formed into a formed article by cold forming even in a case where the plated coating 140 is formed on the surface of the main portion 110, the deterioration of surface properties, such as the degradation or damage of the plated coating caused by heating, is suppressed as compared to the case of hot forming. Particularly, the deterioration of antirust properties, which occurs due to the diffusion of a component of the main portion 110 in the plating caused by heating, is suppressed as compared to hot forming.

Further, according to this embodiment, the plated coating 140 is not formed on at a part or all of the surfaces of the softened portions 120. Accordingly, in a case where welding is performed in the regions 215 to be welded, a reduction in weld strength caused by a Zn component contained in the plated coating 140 is suppressed.

Example of Application of Frame Member According to Embodiment of Invention

Figure 7:
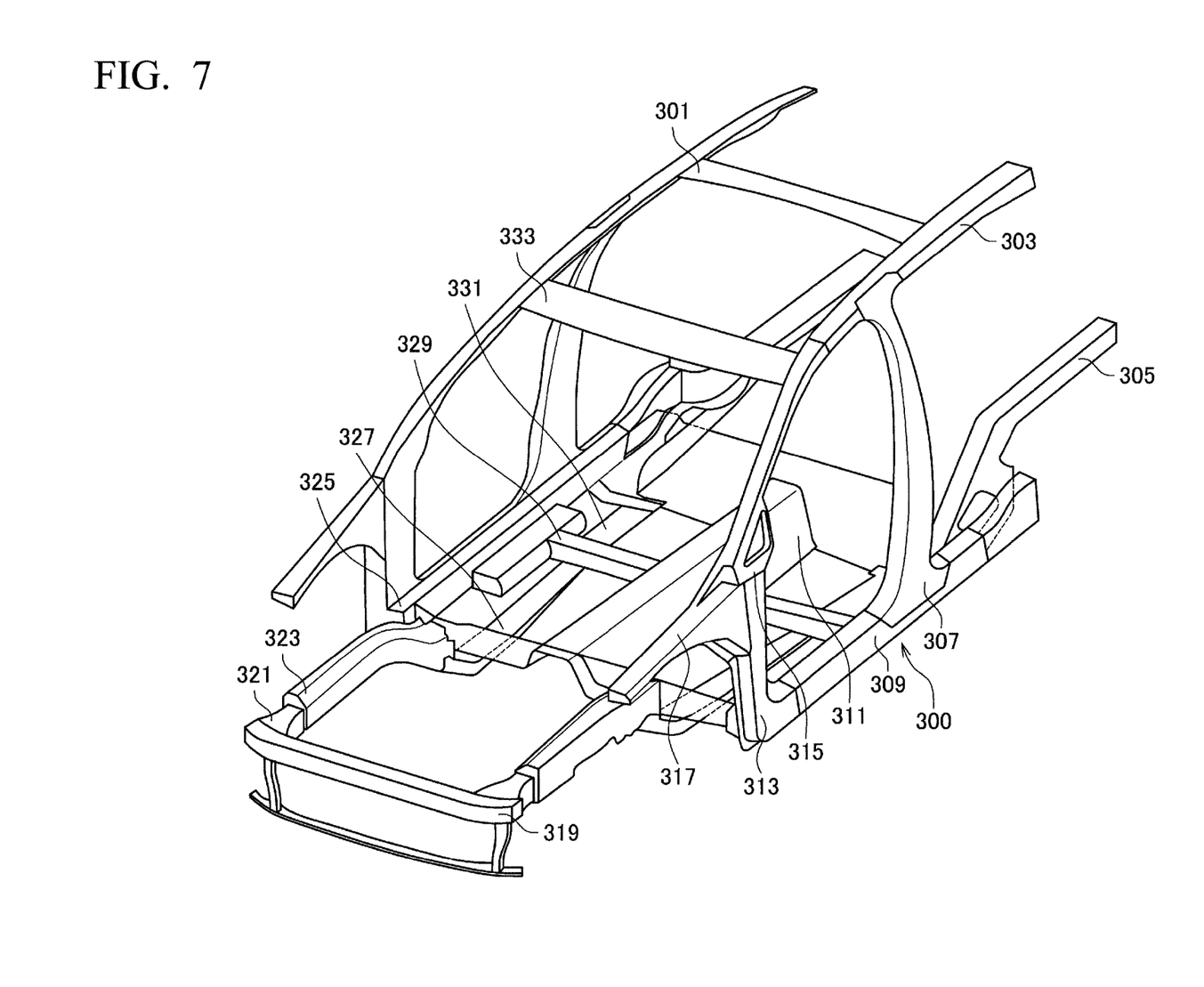
FIG. 7 is a diagram showing a vehicle frame as an example to which a structural member formed using the blank according to the embodiment of the invention is applied.

The preferred embodiments of the invention have been described in detail above. Here, an example of application of the structural member 200, which is formed using the blank 100 according to the embodiment of the invention, will be described with reference to FIG. 7. FIG. 7 is a diagram showing a vehicle frame 300 as an example to which the structural member 200 formed using the blank 100 according to the embodiment of the invention is applied. The structural member formed using the blank 100 may form the vehicle frame 300 as a cabin frame or a shock-absorbing frame. Examples of application as a cabin frame include a roof center reinforcement 301, a roof side rail 303, a B-pillar 307, a side sill 309, a tunnel 311, an A-pillar lower 313, an A-pillar upper 315, a kick reinforcement 327, a floor cross-member 329, an under reinforcement 331, a front header 333, and the like.

Further, examples of application of a frame member as a shock-absorbing frame include a rear side member 305, an apron upper member 317, a bumper reinforcement 319, a crash box 321, a front side member 323, and the like.

A change in the surface properties of the structural member 200, which is formed by cold forming using the blank 100 according to the embodiment of the invention, after forming is suppressed. Further, high strength is maintained while a reduction in the hardness of the heat affected zone of the region 215 to be welded is suppressed. Accordingly, since the influence of the surface properties of a vehicle body frame is reduced in a case where the structural member 200 formed using the blank 100 according to this embodiment is applied as a member forming the vehicle frame 300, strength can be improved.

Examples

In order to evaluate the characteristics of the blank 100 according to this embodiment, the blank 100 according to this embodiment was worked to actually produce the structural member 200 shown in FIG. 3A and the characteristics thereof were evaluated. The structural member 200 had the cross-sectional configuration shown in FIG. 3A, the height (the distance in the Z direction in FIG. 3A) of the structural member 200 was set to 60 mm, the width (the distance in the X direction in FIG. 3A) of the structural member 200 was set to 80 mm, and the length (the distance in the Y direction in FIG. 3A) of the structural member 200 was set to 800 mm.

In Examples, a blank, which used a cold-rolled steel sheet having a tensile strength of 1470 MPa and in which partial tempering was performed at predetermined positions on the cold-rolled steel sheet to form the softened portions 120 and a remaining region of the cold-rolled steel sheet formed the main portion 110, was used as the blank 100. Cold forming was performed using such a blank 100 to produce a substantially hat-shaped member 210. In this case, the substantially hat-shaped member 210 was formed so that the softened portions 120 including welds W were provided at regions 215 to be welded. Further, a steel sheet having a tensile strength of 780 MPa was used as a plate-like member 220. The substantially hat-shaped member 210 was welded to the plate-like member 220 at the regions 215 to be welded. The structural member 200 was produced according to such a procedure.

The ratio of the Vickers hardness of the softened portion 120 to the Vickers hardness of the main portion 110 (the Vickers hardness of the softened portion 120/the Vickers hardness of the main portion 110) was as shown in Table 1 to be described below.

As Comparative Example 1, a structural member was produced according to the same procedure as Example. Further, as Comparative Example 2, a structural member was produced without the softened portions 120 provided at the blank. That is, Comparative Example 2 means a case where the entire blank 100 is a cold-rolled steel sheet having a tensile strength of 1470 MPa.

A crushing test for applying bending moment to both ends of the structural member in a longitudinal direction was performed, and a bending strength ratio and a fracture position were evaluated. Here, the bending strength ratio is a ratio that is obtained in a case where the value of bending strength at the time of occurrence of the fracture of the structural member is standardized as the value of the bending strength of Comparative Example 2. Evaluation results were shown together in Table 1.

TABLE 1

| Sample | Hardness of softened portion/ hardness of main portion | Bending strength ratio | Presence or absence of HAZ fracture |
|---|---|---|---|
| Comparative Example 1 | 0.64 | 0.9 | Absence |
| Comparative Example 2 | 1 | 1 | Presence |
| Example 1 | 0.71 | 0.92 | Absence |
| Example 2 | 0.86 | 0.96 | Absence |

As shown in Table 1, in Example 1 and Example 2, the ratio of the Vickers hardness of the softened portion 120 to the Vickers hardness of the main portion 110 was 0.7 or more and a bending strength ratio had a value larger than 0.9. That is, it was shown that sufficiently strength is maintained in Example 1 and Example 2 as compared to Comparative Example 2 in which the softened portions 120 are not provided. Further, with regard to the evaluation results of a fracture position, fracture occurred at the base material and did not occur in the heat affected zone (HAZ) in both Example 1 and Example 2. That is, as the result of the appropriate adjustment of the Vickers hardness of the softened portion 120 in Example 1 and Example 2, it was shown that the influence of a reduction in hardness caused by heat input during welding was suppressed.

On the other hand, in Comparative Example 1, a ratio of the Vickers hardness of the softened portion 120 to the Vickers hardness of the main portion 110 was lower than 0.7 and fracture did not occur in the heat affected zone. However, the bending strength ratio of Comparative Example 1 did not have a value larger than 0.9 and sufficient strength could not be ensured. Further, since softened portions 120 were not provided in Comparative Example 2, bending strength was sufficiently high but fracture occurred in the heat affected zone due to the influence of a reduction in hardness caused by heat input during welding.

As described above, it was shown that the influence of a reduction in hardness caused by the heat affected zone was suppressed and high strength was maintained by the structural member 200 of which the ratio of the Vickers hardness of the softened portion 120 to the Vickers hardness of the main portion 110 was appropriately controlled.

The preferred embodiments of the invention have been described in detail above with reference to the accompanying drawings, but the invention is not limited to the embodiments. Since it is clear that various modification examples or alteration examples can be thought up by those skilled in the art to which the invention pertains without departing from the technical scope described in claims, it is naturally understood that these examples are also included in the technical scope of the invention.

For example, the substantially hat-shaped member 210 has been used as the first member in the embodiments, but the invention is not limited to such embodiments. The first member has only to have a predetermined shape required to form the structural member 200, and may have a U shape, an arc shape, or the like in a cross-sectional view. Further, the first member may be partially bent in a cross-sectional view or may have irregularities, such as a bead shape.

Furthermore, the plate-like member 220 has been used as the second member in the embodiments, but the invention is not limited to such embodiments. The second member may have a substantially hat-shaped cross section, or may have a U shape, an arc shape, or the like in a cross-sectional view.

Moreover, the second member may be partially bent in a cross-sectional view or may have irregularities, such as a bead shape.

Brief Description of the Reference Symbols

100: blank
110: main portion
120: softened portion
130: joint portion-corresponding region
140: plated coating
210: substantially hat-shaped member (first member)
211, 231: top sheet portion
213, 233: standing wall portion
215, 235: region to be welded
220: plate-like member (second member)
230: substantially U-shaped member (first member)
240: mating member (second member)
W: weld

What is claimed is:

1. A blank comprising:
a main portion that is made of a cold-rolled steel having a tensile strength of 1450 MPa or more; and
a softened portion,
wherein a ratio of Vickers hardness of the softened portion to Vickers hardness of the main portion is 0.7 or more and 0.95 or less,
the softened portion is disposed at a position different from a position of the main portion in an in-plane direction,
the softened portion is formed over a distance of 50% or more and 90% or less of a sheet thickness from one surface of the blank, and
the softened portion is formed in a shape of a band within 100 mm from an end portion in the in-plane direction.

2. The blank according to claim 1,
wherein a plated coating is formed on the main portion, and
the plated coating is not formed on at least a part of a surface of a portion of the blank where the softened portion is formed.

3. The blank according to claim 1,
wherein at least two or more softened portions are formed.

4. The blank according to claim 1,
wherein at least two or more softened portions are formed on one surface of the blank.

* * * * *